United States Patent
Kirch

(10) Patent No.: US 11,792,885 B2
(45) Date of Patent: Oct. 17, 2023

(54) WIRELESS MESH FOR FLUID DISTRIBUTION NETWORK

(71) Applicant: DropWater Solutions, Gainesville, TX (US)

(72) Inventor: Paul Kirch, Gainesville, TX (US)

(73) Assignee: DROPWATER SOLUTIONS, Gainesville, TX (US)

( * ) Notice: Subject to any disclaimer, the term of this patent is extended or adjusted under 35 U.S.C. 154(b) by 58 days.

(21) Appl. No.: 17/155,869

(22) Filed: Jan. 22, 2021

(65) Prior Publication Data
US 2021/0227627 A1     Jul. 22, 2021

Related U.S. Application Data

(60) Provisional application No. 62/964,213, filed on Jan. 22, 2020.

(51) Int. Cl.
| | | |
|---|---|---|
| *H04W 84/18* | (2009.01) | |
| *H04W 40/12* | (2009.01) | |
| *G05B 19/416* | (2006.01) | |

(52) U.S. Cl.
CPC .......... *H04W 84/18* (2013.01); *G05B 19/416* (2013.01); *H04W 40/12* (2013.01); *G05B 2219/41303* (2013.01)

(58) Field of Classification Search
CPC ..... H04W 84/18; H04W 40/12; H04W 28/02; G05B 19/416; G05B 2219/41303; G05B 23/0286; F04B 23/00; F04B 41/00; F04B 49/06; F04B 53/20
See application file for complete search history.

(56) References Cited

U.S. PATENT DOCUMENTS

| | | |
|---|---|---|
| 7,083,202 B2 | 8/2006 | Eberle et al. |
| 7,249,628 B2 | 7/2007 | Pillion et al. |
| 7,883,027 B2 | 2/2011 | Fekeie |
| 7,962,536 B2 | 6/2011 | Culp et al. |

(Continued)

FOREIGN PATENT DOCUMENTS

WO    2007/107815 A1    9/2007

OTHER PUBLICATIONS

Notice of Allowance as issued in U.S. Appl. No. 17/155,920, dated Feb. 14, 2022.

(Continued)

*Primary Examiner* — Jae Y Lee
(74) *Attorney, Agent, or Firm* — Pillsbury Winthrop Shaw Pittman LLP

(57) ABSTRACT

A method includes obtaining a set of operational parameters of a first electronic pump, a first set of measurements collected by a first electronic pump sensor, and a second set of measurements collected by a second electronic pump sensor of a second electronic pump. The method also includes sending the second set of measurements from the second node to the first node, determining a set of state representations based on the measurement data, and determining whether a flow between the first electronic pump and the second electronic pump is in an anomalous state based on the set of state representations and a library of values. The method also includes changing a pump operation in response to a determination that the flow is in the anomalous state.

20 Claims, 5 Drawing Sheets

(56) References Cited

U.S. PATENT DOCUMENTS

| | | | |
|---|---|---|---|
| 8,082,217 | B2 | 12/2011 | Crossley et al. |
| 8,567,177 | B1 | 10/2013 | Drori et al. |
| 8,776,617 | B2 | 7/2014 | Durham et al. |
| 8,843,241 | B2 | 9/2014 | Saberi et al. |
| 9,107,137 | B1 | 8/2015 | Zawodniok et al. |
| 9,241,451 | B2 | 1/2016 | Ersavas et al. |
| 9,297,374 | B2 | 3/2016 | Braggin et al. |
| 9,309,872 | B2 | 4/2016 | Gonnella et al. |
| 9,638,829 | B2 | 5/2017 | Davoodi et al. |
| 9,719,504 | B2 | 8/2017 | Vines et al. |
| 10,067,507 | B2 | 9/2018 | Davoodi et al. |
| 10,480,547 | B2 | 11/2019 | Starkey et al. |
| 2008/0097913 | A1 | 4/2008 | Dicks et al. |
| 2013/0240044 | A1* | 9/2013 | Shreve .................. G01N 30/34 137/468 |
| 2015/0308919 | A1* | 10/2015 | Zhang .................. G01M 3/243 702/51 |
| 2017/0089328 | A1 | 3/2017 | Sato et al. |
| 2018/0013293 | A1 | 1/2018 | Block et al. |
| 2018/0284752 | A1 | 10/2018 | Cella et al. |
| 2019/0187679 | A1* | 6/2019 | Strudwicke ........ G05B 23/0272 |
| 2019/0356537 | A1* | 11/2019 | Grindeland ............ G01R 31/40 |
| 2019/0356740 | A1 | 11/2019 | Yuan et al. |
| 2020/0064797 | A1* | 2/2020 | Hannon .................. H04L 67/34 |
| 2021/0216860 | A1* | 7/2021 | Poghosyan .......... G06N 3/0445 |

OTHER PUBLICATIONS

Notice of Allowance as issued in U.S. Appl. No. 17/155,898, dated Mar. 7, 2023.

\* cited by examiner

WIRELESS MESH FOR FLUID DISTRIBUTION NETWORK

CROSS-REFERENCE TO RELATED APPLICATIONS

This patent claims the benefit of the following U.S. Provisional Patent Applications: U.S. 62/964,216, titled SMART PUMP CONTROLLER, filed 22 Jan. 2020; U.S. 62/964,213, titled WIRELESS MESH FOR FLUID DISTRIBUTION NETWORK, filed 22 Jan. 2020; U.S. 62/964,220, titled MULTI-BANDWIDTH COMMUNICATION FOR FLUID DISTRIBUTION NETWORK, filed 22 Jan. 2020. The entire content of each aforementioned patent filing is hereby incorporated by reference.

BACKGROUND

1. Field

This disclosure relates generally to electronic pumps and, more particularly, to networks of electronic pumps.

BACKGROUND

Fluid distribution networks are useful for providing fluids throughout large geographic regions that can span hundreds or even thousands of kilometers. A fluid distribution network may transport water, gas, and other fluids from a fluid source to one or more fluid destinations and play an important role in various industries such as agriculture, manufacturing, and energy. A fluid distribution network may include pipes to provide one or more pipeline paths for fluid travel and one or more pumps to move fluids through the pipes. Increasing the reliability and efficiency of one or more components of a fluid distribution network can increase the reliability and efficiency of the entire fluid distribution network.

SUMMARY

The following is a non-exhaustive listing of some aspects of the present techniques. These and other aspects are described in the following disclosure.

Some aspects include a process that includes obtaining a set of operational parameters, wherein operations of a first electronic pump are based on the set of operational parameters. The process also includes obtaining a first set of measurements collected by a first electronic pump sensor attached to the first electronic pump and obtaining a second set of measurements collected by a second electronic pump sensor attached to a second electronic pump, where fluid flows between the first electronic pump and the second electronic pump. The process also includes sending the second set of measurements from the second electronic pump to the first electronic pump via a first wireless signal and determining a set of state representations based on the first set of measurements and the second set of measurements. The process also includes determining a reference key based on the set of operational parameters, where the reference key is one of a set of reference keys, and wherein each respective reference key of the set of reference keys is associated with a respective threshold parameter in a library of values. The process also includes retrieving a set of threshold parameter associated with the reference key, determining a threshold based on the set of threshold parameters, and determining whether a flow of the fluid between the first electronic pump and the second electronic pump is in an anomalous state based on the set of state representations and the threshold. The process also includes changing a pump operation of at least one of the first electronic pump and the second electronic pump in response to a determination that the flow is in the anomalous state.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
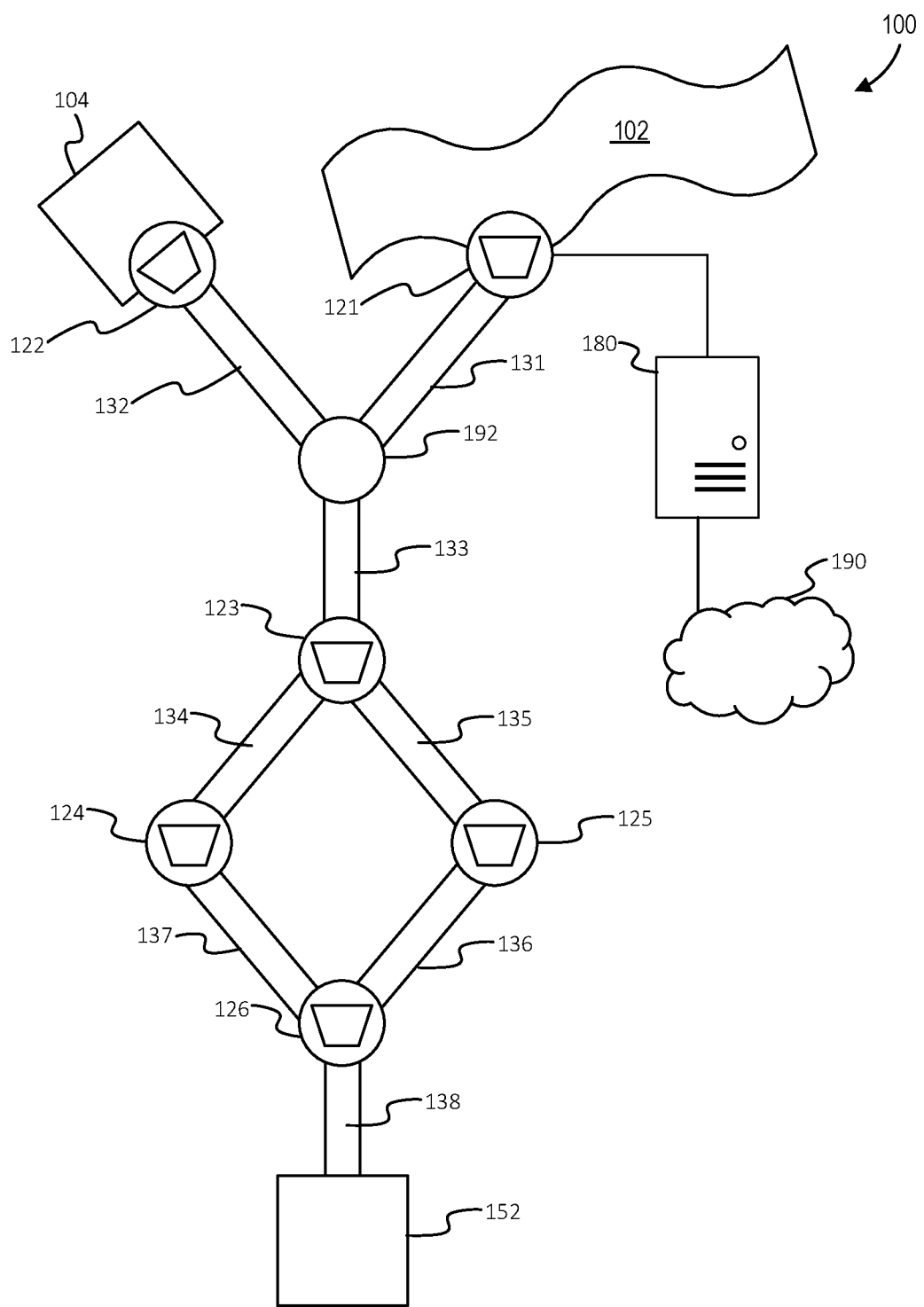
FIG. 1 is a diagram of a fluid distribution network using the present techniques, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of fluid distribution networks. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments include a fluid distribution network having electronic pumps in communication with each other via nodes of a mesh network. In some embodiments, an electronic pump may include one or more computing devices to execute or otherwise act as a node of the mesh network. The electronic pump may obtain measurements from other pumps or sensors distributed at different locations of the fluid distribution network via the node. These measurements may be used in conjunction with one or more operational parameters of the electronic pump to determine whether a part of the flow in the fluid distribution network is in an anomalous state. An anomalous state may be any state not considered to be within operating thresholds at a given operational state, and be caused by improper mixing, pipe leaks, pump failures, unexpected impacts, or other phenomena. An anomalous state may be detected using sensor measurements indicating an unpredicted pressure drop, flow change, or the like. In cases where an anomalous state is detected or categorized, some embodiments may modify one or more operational parameters of an electronic pump in the fluid distribution network.

Determining whether the flow between electronic pumps of a fluid distribution network is in an anomalous state may include performing one or more operations to process and analyze sensor measurements of the fluid distribution network. A computing device of the fluid distribution network may obtain a first set of measurements acquired by a first sensor at a first position of the fluid distribution network and a second set measurements acquired by a second sensor at a second position of the fluid distribution network. For example, the first set of measurements may be acquired by a multi-sensing device in a first electronic pump, and the second set of measurements may be acquired by a second multi-sensing device that is 2000 meters away from the first electronic pump, where the second multi-sensing device may be attached to a pipe or a pump. The electronic pumps may include various sensors and electronically controllable components, such as an electronically controllable recirculation system, heating element, set of electronically configurable valves, or the like. For example, a set of electronic pumps or pump operations used by embodiments described in this disclosure may include pumps or operations disclosed in the patent application U.S. 62/964,216, titled SMART PUMP CONTROLLER, filed on Jan. 22, 2020, which incorporated herein by reference.

In some embodiments, one or more operational parameters or measurements may be used as reference keys in a library of values used to detect an anomalous state. For example, as further described below, pump rotation speeds may be used as reference keys for the library of values. Each reference key may be associated with a set of threshold parameters, where the set of threshold parameters may include a threshold or values used to determine a threshold. Some embodiments may compare measurements or results based on the measurements to a threshold(s) determine whether flow in the fluid distribution network is in an anomalous state. The set of threshold parameters may include a single value, a plurality of values, or instructions to perform an operation to compute a set of values. For example, some embodiments may store a pump's normalized pump speeds as reference keys and use a normalized pump speed as a respective reference key to look up a respective threshold parameter, where the respective threshold may be equal to the mean average pressure difference between a pump's normalized suction pressure and the pump's normalized discharge pressure.

In some embodiments, anomaly detection may prevent or reduce fluid loss by enabling a rapid and context-appropriate response to a flow anomaly. For example, in response to the detection of a pipe burst or leak, a computing device of the fluid distribution network may send instructions to each of the wirelessly-connected pumps to stop pumping fluids or evacuate fluids from a pipe section. Alternatively, or in addition, fluid transport efficiency may be increased by pre-emptively broadcasting a target fluid flow rate to multiple electronic pumps in the fluid distribution network and cause the electronic pumps to synchronously change their rotation speeds or other operational parameter to increase a pumping rate. By enabling the electronic pumps of a fluid distribution network to wirelessly communicate with each other and allowing collective responses to detected issues, the fluid distribution network may increase the efficiency and safety of fluid transport operations across a large region.

FIG. 1 is a diagram of a fluid distribution network using the present techniques, in accordance with some embodiments. The fluid distribution network 100 includes electronic pumps 121-126, pipes 131-138, and a server 180 in connection with a cloud system 190. Some embodiments of fluid distribution networks may be described or modeled as a network of pipes, a network of pumps, a network of channels, or the like. One or more of the electronic pumps 121-126 may include a computer system to perform one or more of the operations described below. In some embodiments, one or more of the electronic pumps 121-126 may include wireless communication devices with mesh capabilities. Example wireless communication devices may include long-range radio mesh communication systems, wireless signal transmitters and receivers, satellite communication systems, Bluetooth/NFC communication systems, or the like. The wireless communication devices may be used to allow communication between each of the electronic pumps 121-126 with at least one of the other of the electronic pumps 121-126 and may be referred to as a "node" of a mesh network. It should be understood that a pump that is described as part of the mesh network includes a wireless communication device that is part of the mesh network. Similarly, sending data to and from a pump may be understood to as sending data to and from a computing device of the pump via a wireless communication device, wherein the computing device may include the wireless communication device. Measurements, instructions, or other data may be wirelessly sent or received by an electronic pump using a multi-bandwidth approach that includes short-range and long-range systems using systems and methods described in patent application U.S. 62/964,220, titled MULTI-BANDWIDTH COMMUNICATION FOR FLUID DISTRIBUTION NETWORK, filed 22 Jan. 2020, the entirety of which is incorporated herein by reference.

In some embodiments, the wireless communication devices of the electronic pumps may operate as part of the mesh network, such as a Long Range ("LORA") network or other low-power wide area network ("LPWAN"). Using a sub-gigahertz frequency network such as a LORA network may permit some embodiments to send wireless messages across large distances (e.g., 1 kilometer or greater, 10 kilometers or greater, etc.), increasing the range of the mesh network. In addition, some embodiments may use LORA or other LPWAN systems to determine the position of one or more electronic pumps or other electronic devices in the network.

In some embodiments, a pump of the fluid distribution network 100 may communicate with one or more electronic devices such as digital sensors using various I/O equipment, such as a ModBus RS-485 serial bus or RS-132 bus, either which may be configured to support the ModBus RTU 1 protocol. In some embodiments, one or more of the computer systems of the set of electronic pumps 121-126 may operate a webserver for hosting intranet sites. For example, a computer system of the first electronic pump 121 may be used to collect data from each sensor of each of the electronic pumps 121-126. In some embodiments, one of the computing devices of the electronic pumps 121-126 may serve as a leader node in a mesh network and may provide or receive information from other electronic pumps. For example, a computing device of the first electronic pump 121 may serve as a leader node and may transmit values such as measurements, state representations, device statuses, or instructions of one or more pumps of the electronic pump 121-126. As a leader node, the electronic pump 121 may send values such as, "pumping has started," "match target flow rate to 50 liters per second," or "shut down." Some embodiments may perform operations to change the leader node from one electronic pump to another electronic pump.

During an operation of the fluid distribution network 100, one or more of the electronic pumps 121-126 may be used to extract fluid from the first fluid source 102 or the second fluid source 104 and transport the fluid through one or more pipes of the pipes 131-138 to the fluid destination 152. As shown in the fluid distribution network 100, fluid flow may be split. For example, the third electronic pump 123 is shown to split the fluid flow from the pipe 132 into a first flow through the pipe 133 and a second flow through the pipe 134. In some embodiments, operations of the third electronic pump 123 may be changed to change a flow rate through one of a set of outlet pipes of the third electronic pump 123 without changing a flow through any other outlet pipes of the third electronic pump 123.

In some embodiments, fluid flow may be re-combined in various flow states, such as laminar flow or turbulent flow. In some embodiments, fluid flow may be combined from two different types of fluids to mix the two different types of fluid. For example, a first fluid from the first fluid source 102 and a second fluid from the second fluid source 104 may be combined at the fluid network position 192. As further described below, some embodiments may change the operations of either or both of the first electronic pump 121 or the second electronic pump 122 in response to measurements obtained from sensors of at least one of the electronic pumps 121-123. For example, the third electronic pump 123 may include a measurement correlated with the mixing of water from the first fluid source 102 and solvent fluid from the second fluid source 104, and, in response to this measurement being outside of a target mixing window, increase the fluid flow from the first fluid source 102 by increasing a pumping rate of the first electronic pump 121.

In some embodiments, a pump of the fluid distribution network 100 may communicate with one or more electronic devices such as digital sensors using various I/O equipment, such as a ModBus RS-485 serial bus or RS-132 bus, either of which may be configured to support the ModBus RTU 1 protocol. In some embodiments, one or more of the computer systems of the set of electronic pumps 121-126 may operate a web server for hosting intranet sites. For example, a computer system of the first electronic pump 121 may be used to collect data from each sensor of each of the electronic pumps 121-126.

Figure 2:
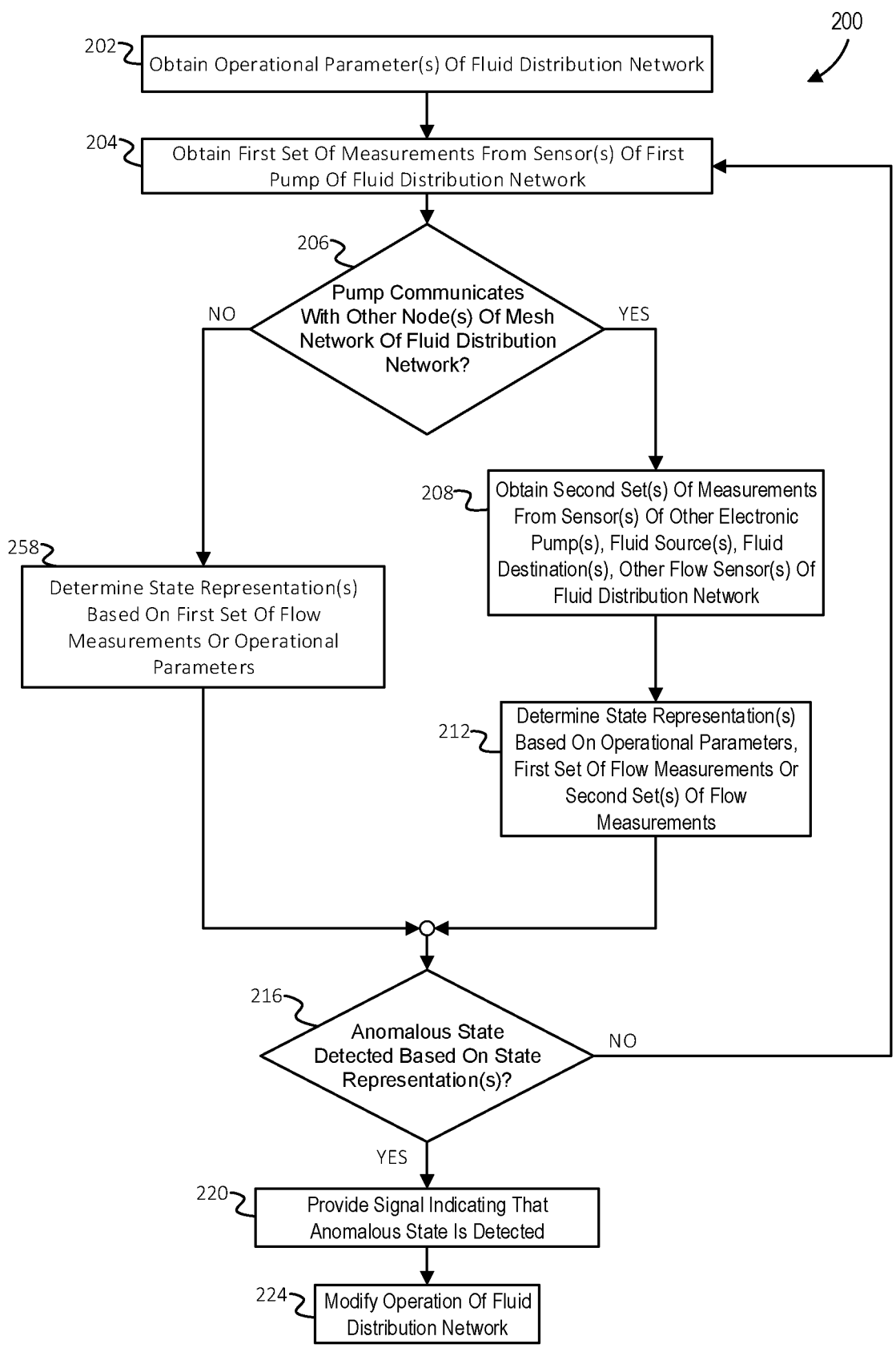
FIG. 2 is a flowchart of operations to control fluid flow in a fluid distribution network, in accordance with some embodiments.

FIG. 2 is a flowchart of operations to control fluid flow in a fluid distribution network, in accordance with some embodiments. In some embodiments, the process 200, like the other processes and functionality described herein, may be implemented by a system that includes computer code stored on a tangible, non-transitory, machine-readable medium, such that when instructions of the code are executed by one or more processors, the described functionality may be effectuated. Instructions may be distributed on multiple physical instances of memory, e.g., in different computing devices, or in a single device or a single physical instance of memory, all consistent with use of the singular term "medium." In some embodiments, the system may include a computing device of a pump that stores or executes some or all of the computer code to perform one or more operations described below. For example, a computing device of the first electronic pump 121 may execute some or all of the computer code. Alternatively, or in addition, the system may include a computing device of an on-premises server or a cloud system that stores or executes some or all of the computer code to perform one or more operations described below. For example, the system may include the server 180 or an application executing on a provisioned server of the cloud system 190 to execute some or all of the computer code to perform one or more operations described below.

In some embodiments, the operations may be executed in a different order from that described. For example, the system may obtain a first set of measurements as described in block 204 before obtaining operational parameters as described in block 202. In some embodiments, operations may be executed multiple times per instance of the process's execution, some operations may be omitted, additional operations may be added, some operations may be executed concurrently and other operations may be executed serially, none of which is to suggest that any other feature described herein is not also amenable to variation. For example, some embodiments may omit executing operations described in block 220.

In some embodiments, the process 200 may include obtaining a set of operational parameters of a fluid distribution network, as indicated in block 202. An operational parameter of a pump may be a controllable input for a pump that will cause the activation, modification, or deactivation of one or more components of the pump. For example, obtaining the operational parameter of a first electronic pump may include obtaining a rotation speed, a power consumption, a filter control, a target pressure, target temperature, a valve configuration, or a solute injection quantity. In some embodiments, obtaining the set of operational parameters may include retrieving a set of operational parameters that are stored in memory by default. Alternatively, or in addition, obtaining the set of operational parameters may include obtaining the parameters after activation of a pump in real-time, such as by obtaining operational parameters via a set of computer program instructions transmitted by wireless signals. Additional, obtaining a set of operational parameters may include obtaining a operational parameter that control a plurality of electronic pumps or obtaining operational parameters from different electronic pumps.

In some embodiments, as further described below, an operational parameter may be normalized. In addition, the system may stop the collection of operational parameters or measurements if the operational parameters indicate non-use or abnormal use of the pump. For example, if the operational parameters of a pump indicate that the pump is idling (e.g., a pump's rotation speed is below a rotation threshold), obtaining measurements as described below for blocks 204, 208, or 258 may be stopped. Once the operational parameters of the pump indicate that the pump is operating to pump water again (e.g., the pump's rotation speed is above the rotation threshold), obtaining measurements using one or more of the operations described below may be resumed.

In some embodiments, the process 200 may include obtaining a first set of measurements from one or more sensors of a first electronic pump of the fluid distribution network, as indicated in block 204. A sensor of the first electronic pump may be any sensor attached to the first electronic pump, connected by a wired connection to an electrical component of the first electronic pump, or otherwise within the proximity of the first electronic pump (e.g., within 100 meters of the first electronic pump and in communication via a Wi-Fi network). The first set of measurements may include various measurements such as a flow rate, a fluid temperature, a fluid pressure, a fluid resistivity measurement, or the like. For example, the first set of measurements may include a discharge pressure of the fluid at a pump outlet and a suction pressure of the fluid at the pump inlet. In some embodiments, a plurality of measurement types may be measured concurrently. For example, a computing device of a fluid distribution network may obtain a discharge pressure, a fluid temperature, and a resistivity measurement every 30 seconds over a 24 hour period.

In some embodiments, one or more pre-processing filters may be applied to reduce the effect of sensor noise or other sources of error when obtaining sensor measurements. For example, some embodiments may store 255 measurements and time points corresponding to when each of the measurements was obtained or a sample rate(s) indicating the time between each measurement. Some embodiments may then determine whether to include one or more measurements as part of the first set of measurements if the change over time satisfies a change-over-time-threshold, which may be determined based on a ratio between the measurement and the sample rate. In some embodiments, if the change over time is greater than a change-over-time-threshold, some embodiments may determine this change to be sensor error and include instructions to ignore the new measurements. For example, some embodiments may average a measured pressure over a 30 second period to determine an average pressure value for the 30 second duration and set the change-over-time-threshold to be equal to be 150% of the average pressure value for any set of 30-second measurements. If a new measured pressure is measured within 30 seconds after the duration corresponding to the average pressure measurement and exceeds 150% of the average pressure value, the new measured pressure may be discarded. Furthermore, while the above is described with respect to obtaining a first set of measurements, similar operations may be performed when obtaining other sets of measurements.

In some embodiments, the first set of measurements may be stored in a computer memory system attached to the first electronic pump. For example, the measurements from a programmable logic controller (PLC) of a sensor may be stored in one or more Modbus registers of the PLC. In some embodiments, the measurements may then be transmitted to other computing devices of the fluid distribution network via a mesh network, such as the one described above. In addition, the measurements may be transmitted to other systems for reporting, anomaly-detection, or analytical purposes.

In some embodiments, the first set of measurements may include measurements from a multi-sensing device. A multi-sensing device may include a pressure sensor subsystem and a vacuum sensor subsystem. In some embodiments, the pressure sensor subsystem may measure pressures greater than a maximum pressure measurement provided by the vacuum sensor subsystem. The vacuum sensor subsystem may measure pressures less than a minimum pressure measurement provided by the vacuum sensor subsystem. The pressure sensor subsystem may provide measurements of pressures greater than 100,000 Pascals (Pa), and the vacuum sensor subsystem may provide measurements of pressures less than or equal to 100,000 Pa.

In some embodiments, operations of the multi-sensing device may include protecting the vacuum sensor subsystem or otherwise disabling the vacuum sensor until the pressure sensor of the multi-sensing device falls below a pressure measurement threshold. For example, the multi-sensing device may include circuitry that reports pressure measurements from the pressure sensor subsystem when the measured pressure is greater than 100,000 Pa, and switches to reporting pressure measurements from the vacuum sensor when the measured pressure is less than 100,000 Pa. As further discussed below, switching between measurement readings may increase the accuracy and device lifespan of the vacuum sensor subsystem. As further discussed below, the structure, arrangement, and operations of the multi-sensing device may be modified to increase compatibility with the possible extreme environments of a fluid distribution network.

In some embodiments, the process 200 may include determining whether the pump is able to communicate with one or more nodes of a mesh network of the fluid distribution network, as indicated in block 206. In some embodiments, a computing device of the pump may determine that it can communicate with one or more nodes of a mesh network upon receipt of a signal from the one or more other nodes. For example, a first electronic pump of a fluid distribution network may determine that the first electronic pump may communicate with other nodes after receiving a wireless signal from another node (e.g., a wirelessly-connected sensor, a second electronic pump, etc.) of the fluid distribution network. In some embodiments, the computing device of the first electronic pump may include additional operations to distinguish between different types of electronic devices in communication with the first electronic pump. For example, a computing device of the first electronic pump may determine that it is able to communicate with a pressure sensor that is over 1000 meters away but not able to communicate with any electronic pumps based on one or more wireless signals received by the first electronic pump. If the pump is determined to as able to communicate with one or more nodes of a mesh network of the fluid distribution network, operations of the process 200 may proceed to block 208. Otherwise, operations of the process 200 may proceed to block 258.

In some embodiments, the process 200 may include obtaining a second set(s) of measurements from a set of sensors of a set of other electronic pumps, pipes or other fluid conduits in the fluid distribution network, a fluid source(s), or a fluid destination(s), or another flow sensor(s) of the fluid distribution network as indicated in block 208. The second set(s) of measurements may include various types of measurements. For example, a second set of measurements may include a flow rate, a fluid temperature, a fluid pressure, a fluid resistivity measurement, or the like from one or more sensors distributed through the pipes 131-138. In some embodiments, a second set of measurements can be obtained by sensors of a second electronic pump in the fluid distribution network. For example, a second set of measurements acquired by the sensors of the second electronic pump 122 may be sent in a wireless signal to a computing device of the first electronic pump 121. Alternatively, or in addition, measurements from sensors of a plurality of electronic pumps may be used. For example, a second set of measurements may be provided by sensors of the second electronic pump 122 and a third set of measurements may be provided by sensors of a third electronic pump 123. Alternatively, or in addition, some embodiments may include obtaining sensor measurements from one or more sensors positioned at a fluid flow source or a fluid flow destination. For example, some embodiments may include a sensor to measure a tank volume at the fluid destination 152.

In some embodiments, a second set of measurements may be provided to a computing device of the first electronic pump or to another computing device. Providing the set of measurements or other data may include transmitting the data over a LORA network or other WAN system. In some embodiments, data transfer may depend on a measured connection quality. For example, the pump 124 may include a first LORA network node and may transmit data to the third electronic pump 123, which may be a second LORA network node. By wirelessly communicating measurements from sensors distributed across different locations of the fluid distribution network, the fluid distribution network may detect anomalies that would have been more difficult to detect using sensors limited to a single location.

In some embodiments, the process 200 may include determining a set of state representations based on the operational parameters, first set of measurements, or second set(s) of measurements, as indicated in block 212. In some embodiments, the set of state representations may include the operational parameters, first set of measurements, or second set of measurements themselves. For example, if the first set of measurements include a first pressure measurement, the set of state representations may include the first pressure measurement. Alternatively, or in addition, the set of state representations may be determined using one or more functions that take the operational parameters, the first set of measurements, or the second set of measurements as inputs. For example, the set of state representations may include a measure of central tendency (e.g., mean, median, mode) of a set of flow rate measurements, temperature measurements, and pressure measurements obtained by sensors of a first electronic pump and a measure of central tendency of a set of flow rate measurements, temperature measurements, and pressure measurements obtained by the sensors of a second electronic pump. In some embodiments, the set of state representations may be determined by calculating a sum of a first set of measurements and a second set of measurements or difference between the first set of measurements and the second set of measurements. For example, a set of state representations may be equal to or otherwise include the difference between the temperature value at a first electronic pump and the temperature value at a second electronic pump.

As discussed above, a reference key may be determined as being equal to or otherwise be based on a state representation or portion of a state representation, where the reference key may be a single value or a set of values (e.g., a vector). For example, a state representation may include an operational parameter such as a pump rotation speed, as measured in rotations-per-minute (RPM). As used herein, parameters or measurements may include normalized parameters or normalized measurements. For example, the rotation speed of a pump may be stored as a normalized value, where the pump rotation speed may be normalized based on a normalization constant for rotation speed (e.g., a maximum rotation speed in RPM). A normalized rotation speed may then be set as a reference key and, as further described below, be used as a key to determine which set of threshold parameters in a library of values to use for detecting or categorizing an anomalous state. Alternatively, or in addition, the reference key may include or otherwise be based on a measurement. For example, the reference key may include a value equal to a discharge pressure, which may be normalized based on a pre-set reference value for a pressure measurement (e.g., a theoretical maximum pressure rating for a pipe connected to the pump). In some embodiments, the operational parameter or fluid measurement may be used in combination as a reference key.

Some embodiments may determine a measure of central tendency or other summary value by updating a sum of previous measurements with a new measurement(s) and divided by a total number of measurements corresponding to the sum of previous measurements. For example, after a sequence of five measurements, the pressure measurements corresponding to each of the five measurements may include 50 kilopascals (kPa), 75 kPa, 100 kPa, 125 kPa, and 150 kPa, resulting in 500 kPa as the sum of the previous pressure measurements. When a measure of central tendency is to be used to detect or categorize an anomaly, the system may divide the sum of previous pressure measurements by the number of measurements. Additionally, some embodiments may delete or otherwise discard individual measurements after they have been used to determine a sum. By storing sums instead of individual values and preventing normalization computations until use, some embodiments may reduce memory requirements and computation costs. Such reductions may increase the efficient use of memory and computing resources, which may be limited in computing devices associated with electronic pumps.

In some embodiments, the operational parameter, measurement, or other value used as a reference key may be rounded to a pre-determined value using a binning method. A binning method may include various quantization methods that group data points within an interval into a single value of that interval. For example, each of a set of 200 normalized rotation speeds may range between 0.0 to 1.0 and may be binned into one of 10 intervals between zero and one, where the value 0.03 would be binned into the interval "0-0.1". Other sizes of bins or numbers of bins may be used. For example, a reference range may be split into more than 10 bins, more than 40 bins, more than 100 bins, or the like. In addition, if a reference key includes a reference vector, each element of the reference vector may have the same number of bins or different numbers of bins.

In some embodiments, a reference key may be determined based on both a sensor measurement and an operational parameter. For example, a state representation may include a pressure difference, and some embodiments may calculate the pressure difference based on a difference between a discharge pressure of a first electronic pump and a suction pressure of a second electronic pump, where the first electronic pump is operating at a first rotation speed. The system may normalize and assign the first rotation speed to a first bin. After computing the pressure difference, the system may store the pressure difference and associate the pressure difference with a second bin. Some embodiments may then determine the reference key based on the first bin and the second bin, where the reference key is associated with a set of threshold parameters stored in a data structure. By using a reference key of the data structure to retrieve thresholds, values used to calculate a threshold, or other values from the data structure, some embodiments may retrieve data associated with the reference key more efficiently and quickly.

In some embodiments, the set of state representations may be determined based on a time series that includes measurements made over time. The time series may include values for one or more types of measurements, such as pressure measurements, temperature measurements, flow rate measurements, density measurements, or the like. For example, a set of time series may include a first set of pressure measurements from a first pressure sensor and a second set of pressure measurements from a second pressure sensor, where both the first and second set of pressure measurements may be concurrently acquired every 30 seconds over a 30-minute interval. In some embodiments, the time series may include data from three or more electronic pumps. For example, a set of time series may include flow rate measurements, pressure measurements, and temperature measurements from every pump in a fluid distribution network. Some embodiments may then determine a set of time series differences via subtracting a time series of a first sensor from a time series of a second sensor, where the set of state representations may include the set of time series differences.

In some embodiments, the set of state representations may be determined as being equal to or based on one or more frequency values. The frequency values may include a first set of frequency values based on the first set of measurements and a second set of measurements determined based on the second set of measurements. In some embodiments, a set of frequency values may be determined from measurements based on a Fast Fourier Transform (FFT) method. For example, a set of flow rate measurements may be used as part of a time series, and the five greatest frequency components, as determined by the FFT method, may be used as the state representation.

In some embodiments, a set of state representations may be in a reduced dimensional form with respect to a set of measurements provided by sensors of a fluid distribution network. Alternatively, or in addition, the set of state representations may include an unmodified set of measurements. For example, the set of state representations may include a set of flow rate measurements from a sensor. Using unmodified measurement values as state representations may increase the accuracy of certain data analysis operations. For example, as further discussed below, using unmodified measurements may increase the accuracy clustering operations based on the set of state representations if the set of state representations is or otherwise includes a set of measurements.

As discussed elsewhere in this disclosure, some embodiments may obtain additional sets of measurements from other electronic pumps or other sensors. Some embodiments may perform computations at one or more electronic pumps based on these additional sets of measurements. For example, a first electronic pump may receive measurements sent from a second electronic pump and a third electronic pump, and the second electronic pump may receive measurements sent from a fourth electronic pump. Some embodiments may divide the computational workload to determine state representations by computing an intermediate set of state representations based on collected measurements. For example, the second electronic pump may include a set of processors used to determine an intermediate set of state representations based on the second set of measurements and the fourth set of measurements before sending the intermediate set of state representations to the first electronic pump or another computing device. Some embodiments may then use the intermediate set of state representations to determine a final set of state representations, where the determination of the final set of state representations may be performed using another set of processors of another electronic pump or another computing device. Some embodiments may compare connection quality measurements to select a leader node that may perform operations such as computing the final set of state representations or sending the set of state representations to a data destination, such as another computer device. For example, after a determination that the first electronic pump has a greater bandwidth (or other connection quality measurement) with a remote server compared to the bandwidths of other electronic pumps, some embodiments may elect the first electronic pump as a leader node that then sends measurements, statuses, or other indicators to a remote computer device.

In some embodiments, the process 200 may include determining a set of state representations based on the operational parameters or first set of measurements, as indicated in block 258. In some embodiments, the set of state representations may include the operational parameters or first set of measurements themselves. For example, if the operational parameter includes a first rotation speed, the set of state representations may include the first rotation speed. Alternatively, or in addition, the set of state representations may be determined using one or more functions that take the operational parameters or first set of measurements as inputs. For example, the set of state representations for a pump may include a measure of central tendency of a power consumption values of a pump, or a pressure difference between an inlet suction pressure and outlet discharge pressure of the pump. In some embodiments, the system may populate a library of values to associate a set of threshold parameters with one or more reference keys, where the reference key may be based on an operation parameter, and where the set of threshold parameters may be based the first set of measurements. As discussed elsewhere in this disclosure, some embodiments may determine a threshold based on a set of threshold parameters by retrieving a threshold stored directly in the set of threshold parameters. Alternatively, or in addition, some embodiments may determine a threshold based on a set of threshold parameters by using the threshold parameters as inputs for a function used to determine a threshold.

In some embodiments, the process 200 may include determining whether an anomalous state is detected based on the set of state representations, as indicated in block 216. In some embodiments, an anomalous state may include specific labels associated with physical phenomena, such as "pipe leak", "pipe burst", "contaminant introduced," "phase change occurring," "chemical reaction occurrence," or the like. Alternatively, or in addition, an anomalous state may include labels that indicate that a flow state in a pipe is in an anomalous state without specifying a specific physical cause of the anomaly.

Various methods of anomaly detection may be used. In some embodiments, the library of values may include the set of reference keys as index values, where each of the set of reference keys are associated with a respective set of measurements or state representations based on the respective set of measurements. For example, the library of values may include a set of normalized rotation speed as a set of reference keys. For each respective rotation normalized pump rotation speed of the set of normalized pump rotation speed, the library of values may include a respective set of measurements. In some embodiments, the system may determine whether one or more values of a set of state representations exceed a threshold based on the respective set of measurements. For example, some embodiments may determine that a mean average of the previous 20 pressure difference measurements have been less than a threshold amount below the average pressure difference value.

In some embodiments, both the state representation and the threshold(s) to which the state representation is compared to may be measures of central tendency such as means or medians. For example, the state representation may be a mean average of a previous 15 suction pressures and the threshold may be a mean average of a previous 255 suction pressures. By using measures of central tendency over multiple measurements instead of relying on a single measurement to determine whether a flow is in an anomalous state, the effects of sensor noise, drift, and other sources of sensor error on anomaly detection may be reduced.

In some embodiments, instead of using a fixed number of previous measurements when determining a measure of central tendency, some embodiments may use a duration to determine which measurements to use. For example, a state representation may include a mean average of the previous pressure differences calculated over a past 10 minutes, and a threshold may include a mean average of the previous pressure differences calculated over a past 120 minutes, where pressure differences may include a difference between discharge pressures measured at a first electronic pump and suction pressures measured at a second electronic pump. By using durations instead of measurement counts to determine which measurements to analyze, infrequent sampling, sensor noise, and other sources of sensor error may be mitigated.

In some embodiments, if a state representation is greater than a threshold representing a maximum value or less than a threshold representing a minimum value, the system may determine that the flow of a fluid distribution network is in an anomalous state and may also determine a specific category for the anomalous state. For example, some embodiments may operate at a first normalized rotation speed "0.25" based on the rotation speed being equal to 25% of a maximum rotation speed. Some embodiments may then use the value "0.25" as a reference key to retrieve a set of threshold parameters [100, 90%, 50%] stored in a data table record by using "0.25" as an index value for the data table. Some embodiments may then determine maximum and minimum value thresholds of 50 kPa and 90 kPa based on the set of threshold parameters using a threshold-determining routine that multiplies the first threshold parameter with the second or third threshold parameters, respectively. If the state representation is 20 kPa, some embodiments may determine that the state representation is less than the minimum value threshold 50 kPa and then determine that the flow is an anomalous state. In some embodiments, the system may use additional thresholds or other criteria to categorize an anomalous state further. For example, some embodiments may include operations to label an anomaly as a pipe burst based on a pressure difference being less than 10% of an average pressure difference.

In some embodiments, the library may include a set of parameters in a trained neural network. For example, a computing device may obtain the measurements from sensors of a first electronic pump and measurements from sensors of a second electronic pump as inputs, and, in response, categorize the flow between the first electronic pump and the second electronic pump using a neural network. The neural network may be trained and may be operated on a hardware specialized for accelerating artificial intelligence (AI) operations. For example, some embodiments may include application-specific integrated circuits (ASIC) that include specialized inference-compute engines that may be optimized for low-precision computations.

In some embodiments, the library of values may include correlations or mappings between measurements, operational parameters, or combinations thereof. For example, a library of values may include a data table comprising empirically tested values correlating pump rotation speeds and discharge pressures with a flow rate. In some embodiments, the data table may be populated during a calibration test performed on the fluid distribution network. For example, after a calibration test, the data table may include an entry that maps the normalized rotation speed 0.5 and the normalized discharge pressure 0.25 with the flow rate 600 liters pers second. In some embodiments, the mapping of operational parameters or a first subset of measurements to one or more other measurements may be especially useful to overcome limitations in in equipment or to verify the accuracy of equipment. For example, by correlating rotation speed and discharge pressure to flow rate, a fluid flow rate in the fluid distribution network may be predicted without the use of a flowmeter.

In some embodiments, the system may determine that the state representation is indicative of non-anomalous behavior in cases that would otherwise trigger a determination that the fluid is in an anomalous state. For example, the system may determine that the operations of a pump is in an "idle" flow state and that anomalous data (e.g., sudden pressure drop) may be ignored. In some embodiments, a determination that a pump is in an "idle" state may cause the system to stop data collection operations or otherwise prevent measurements or operational parameters to change the library of values.

In some embodiments, a neural network used to detect anomalies in a fluid distribution network may include one or more various types of neural networks, such a feedforward neural network, recurrent neural network, radial basis function network, modular networks, some combination thereof, or the like. A neural network may include an input layer and a set of additional layers, where each layer may include a set of neural network nodes. A neural network may include multiple additional layers, where state representations or other values may be used as inputs to compute a set of intermediate output values from a first layer. Then, the set of intermediate output values may be used as inputs for a second layer of the neural network to produce another set of output values, which may be used as another set of intermediate output values or as the final set of outputs of the neural network. A neural network may be trained by using a pre-existing dataset to train encoder weights in the hidden layers, where the dataset includes training input state representations and objective values that may indicate a status of the fluid distribution network. A status of the fluid distribution network may be indicated using a Boolean, numeric value, categorical value, or the like. The status of the fluid distribution network may refer to a status of the entire fluid distribution network or a portion of the fluid distribution network. Example statuses may indicate that the entire pump is operating within expected parameters, that a section of pipe is showing anomalous behavior, that a mixture has one or more physical properties outside of a target range, or the like.

During the training of the neural network, the training input may be used to produce training outputs. Loss function results based on differences between the training output and the objective values may be backpropagated (e.g., gradient descent backpropagation) to modify the parameters of the neural network over series of iterative training operations to better match the training output with the objective values. Furthermore, training methods other than gradient descent may be used to train a neural network, such as a global optimization method (e.g., genetic algorithms, simulated annealing, or particle swarm optimization). Once trained, the neural network may be used to reduce a set of state representations to a numeric or categorical value that may then be used to determine a status of the fluid distribution network.

In some embodiments, a feedforward neural network (e.g., autoencoders, single-layer perceptrons, multi-layer perceptrons, convolutional neural network, or the like) may be used. The neural network nodes of a feedforward neural network are acyclic and thus do not connect with neural networks in previous layers. The acyclic property of a feedforward neural network may increase a computation speed when calculating the output of the feedforward neural network. This speed increase may be advantageous when attempting to respond to issues in real-time.

In some embodiments, a recurrent neural network may be used. In recurrent neural networks, the output of a previous time step may be used as input when calculating an output for a current time step. For example, a recurrent neural network may use a first pressure value as an input value to determine a first output value, where the first pressure value is measured at a first time point that is 30 seconds before a second time point at which a second pressure value is measured. The recurrent neural network may then use the first output value and the second pressure value to determine a second output value. Example recurrent neural networks may include convolutional recurrent neural networks, Hopfield networks, LSTM neural networks, gated recurrent units, or the like.

In some embodiments, a computing device may perform operations to implement one or more other machine learning methods for anomaly detection, such as reinforcement learning operations, support vector machine operations, decision tree operations, Linear classifier operations (e.g., linear discriminant analysis, Naïve Bayes, logistic regression), clustering operations (e.g., centroid-based clustering, connectivity-based clustering, density-based clustering, subspace clustering, or the like), or the like. For example, a computing device of the fluid distribution network may receive a set of pressure and temperature measurements and perform operations to implement a decision tree to determine whether a pipe of a fluid distribution network shows signs of a flow anomaly such as a pipe burst.

A library of values may include one or more library parameters used by one or more of these other learning operations. In some embodiments, a computing device may perform a plurality of classification operations. For example, a computing device may use an autoencoder to perform a first classification operation to detect a first anomalous status and use clustering to detect second anomalous status. In some embodiments, library parameters, such as clustering parameters, anomalous status labels, or neural network parameters may be transmitted to multiple computing devices throughout a mesh network of the fluid distribution network.

In some embodiments, anomaly properties may be identified. Some anomalies such as leaks, pipe bursts, or temperature changes may be associated with one or more quantities indicating the severity of the anomaly. For example, a pipe leak may be associated with a flow rate loss indicating the amount of fluid being lost from the pipe leak. In some embodiments, this flow rate loss may be determined by determining an unaccounted-for pressure drop, a loss in volumetric flow, or other determinations. For example, some embodiments may detect that a fluid velocity through a first electronic pump is greater than the fluid velocity through the second electronic pump. In response, some embodiments may compute the amount of fluid being lost through the pipe between the first and second electronic pump based on a pipe cross-section and related geometries of the fluid path through the fluid distribution network.

In some embodiments, measurements from one or more sensors may be used to detect that a pump mixture is outside of a mixing threshold of a set of target mixing properties. For example, a first sensor may detect that a mixture has a mixing ratio equal to 99% water and 1% polymer and that the corresponding dynamic viscosity of the mixture is 1.0 centipoise. If the target mixing ratio is 98% water and 2% polymer and the threshold dynamic viscosity of 1.2 centipoise, a computing device may determine that an anomaly has been detected after receiving a wireless signal that includes data from the first sensor. In response, as discussed further below, the operation of one or more upstream pumps may be altered to modify the properties of the mixture until the target mixing properties are matched.

In some embodiments, measurements from one or more sensors may be used to detect that one or more properties of a fluid flow in a fluid distribution network is outside of acceptable operational bounds based on comparisons of fluid flow associated with different portions of the fluid distribution network. For example, some embodiments may modify operations of a set of electronic pumps to synchronize the flow rate of pumps along a fluid distribution network. As further described below, pump synchronicity may include ensuring that a plurality of the electronic pumps are operating with approximately the same amount of power or another operational parameter.

In some embodiments, detecting an anomalous state may include predicting a measurement of the fluid distribution network at a position between a first and second electronic pump. In some embodiments, a third sensor may be spatially between a first electronic pump sensor and a second electronic pump sensor, and the state representations may be used to determine a predicted fluid measurement or other measurement at the position of the third sensor. In some embodiments, the predicted measurement associated with a third sensor position may be compared to an actual measurement by the third sensor to verify one or more measurements of the third sensor or determine the existence of sensor error for at least one of the first electronic pump sensor, second electronic pump sensor, or third sensor. For example, some embodiments may compute a predicted flow rate based on sensor measurements from a first electronic pump sensor and a second electronic pump sensor and may compare the predicted flow rate to an actual flow rate measurement measured by a third sensor. In response to a determination that the predicted flow rate differs from the actual flow rate by greater than a difference threshold, some embodiments may determine that one or more sensors of the fluid distribution network system is indicating sensor error.

In some embodiments, the process 200 may include providing a signal indicating that the anomalous state is detected, as indicated in block 220. In some embodiments, the signal may include an indicator that indicates detection of the anomalous state, where the signal may be transmitted via a wireless connection. For example, the signal may be transmitted from a wireless transmitter using one or more frequencies. In some embodiments, the signal may be propagated through a wireless network, such as a LORA network, where each computing device may act as a node of the wireless network. Alternatively, or in addition, the status of the fluid distribution network may be propagated through a wired connection or even through a pipe system itself. For example, some embodiments may be electrical connected to a pipe system, where the pipe system includes a conductive material such as steel, and electrical signals may be transmitted through the pipe system itself.

In some embodiments, a wireless signal may include a single electromagnetic wave. Alternatively, or in addition, the wireless signal may include multiple electromagnetic waves to be transmitted across a plurality of frequencies or frequency channels. Furthermore, a wireless signal may include electromagnetic waves transmitted at different times. For example, a wireless signal may be transmitted as a first set of radio waves and a second set of radio waves, where the first set of radio waves are transmitted five milliseconds before the second set of radio waves. Similarly, a set of sensor measurements may be transmitted in a wireless signal by transmitting a first subset of the sensor measurements in a first set of radio waves and then transmitting a second subset of the sensor measurements in a second set of radio waves, where the second set of radio waves are sent 50 milliseconds after the first set of radio waves are sent. In addition, the wireless signal may include one or more set of geospatial coordinates indicating a pump position or a position between two pumps associated with the anomalous state.

In some embodiments, transmitting data through a wireless network may include implementing one or more data compression algorithms. Data compression algorithms such as lossless compression algorithms or lossy compression algorithms may be used. In some embodiments, the data may be transmitted over a wireless signal as a set of 16-bit integer values. For example, some embodiments may transmit data or one or more instructions by transmitting three 16-bit integers. In some embodiments, a computing device attached to the receiver of the 16-bit integer may partition one or more of the 16-bit integers into distinct values to determine a measurement of a sensor, an operational parameter of a pump, or the like. For example, the first six bits of a 16-bit integer may be used to represent 1 of 64 possible operational parameter values for a normalized RPM of a pump and the next seven bits of the 16-bit integer may be used to represent 1 of 256 possible measurement values for a normalized pressure measurement.

In some embodiments, sending data through a mesh network of a fluid distribution network may include using one or more wireless devices of a pump as a relay node of the mesh network. For example, a first node of a mesh network may transmit a first wireless signal that includes an indication that a second node of the mesh network is an intended destination node for the signal, where the first node and second node may be a first electronic pump and second electronic pump, respectively. The first wireless signal may be received at a third node of the mesh network. The third node may then determine that it is not the intended destination node of the first wireless signal based on information encoded in the first wireless signal and, in response, relay the information in the first wireless signal by sending a second wireless signal to the second node of the mesh network. Such relay operations may be useful in cases where each node of the mesh network may be unable to communicate with each other.

In some embodiments, the topology of a wireless network may be charted to include signal-interfering barriers, where the path through the nodes of the mesh network may be changed based on the presence of the signal-interfering barriers. For example, data from a first node of the mesh network may be transmitted via either a first path that routes the data from the first node to a second node via a third node. However, a signal-interfering barrier such as a cliff wall or a radio-jamming tower may interfere with signals between the first node and third node. In response to the detection of a signal-interfering barrier, some embodiments determine a set of signal pathways between nodes of the mesh network that may circumvent one or more signal-interfering barriers. A signal pathway may include any path between a first node and a second node having at least one intermediary node to receive data originating from the first node and transmit the data to the second node or another intermediary node. For example, the system may route data from a first node of a mesh network to a fourth node and a fifth node of the mesh network before arriving at a second node of the mesh network to circumvent a signal-interfering barrier between the first node and the second node.

In some embodiments, the process 200 may include modifying an operation of the fluid distribution network, as indicated in block 224. Modifying an operation of the fluid distribution network may include modifying the operation of one pump of the fluid distribution network. The modification may depend on or be otherwise based on the type of anomaly detected and its associated values. For example, in response to a determination that a pipe has burst, the flow rate through one pump of the fluid distribution network may be increased. Alternatively, or in addition, the operation of a plurality of electronic pumps may be modified. For example, if a pipe leak is detected between a source pump and a destination pump, the flow rate of fluid through the source pump may decreased (e.g., slowed or stopped) and the flow rate of fluid through the destination pump may be increased. By reducing or completely stopping a pump flow rate of fluid into a pipe from the source pump of the pair of pumps while increasing a pump flow rate of fluid out of the pipe into the destination pump of the pair of pumps, the fluid distribution network may increase the rate of evacuation of the fluid from the pipe.

Some embodiments may modify one or more operations of a fluid distribution network to satisfy one or more target values. For example, if a detected flow anomaly indicates an incorrect ratio of a first fluid and second fluid forming a fluid mixture, the flow rate of a first electronic pump may be increased or decreased in order to change the ratio. For example, if a water content of a water-detergent mixture is too low, the pump controlling the flow rate of water for the mixture may be increased or a pump controlling the flow rate of detergent for the mixture may be decreased. In some embodiments, modifying pump operations of a fluid distribution network may include setting a first electronic pump as a lead pump and decreasing the responsivity of other electronic pumps to changes caused by the lead pump. For example, in response to a determination that the detergent content of a water-detergent mixture is too low, the system may cause a first electronic pump to increase its rotation speed and prevent other electronic pumps from increasing their rotation speeds by changing one or more coefficients values used to control the rotation speeds of the other electronic pumps. In some embodiments, the responsive operational changes provided by the fluid distribution network may reduce the need for mixing equipment in the pump.

In addition, or alternatively, other operational parameters of a fluid distribution network may be changed. For example, fluids may change properties based on temperature, and the heat flow of a pump or pipe may be changed in response to the detection of an anomaly. Similar to the above, some embodiments may include instructions to designate one of the electronic pumps as a lead pump when controlling a parameter and inhibit other electronic pumps from following subroutines that would otherwise instruct the other electronic pumps to respond to changes caused by the lead pump.

In some embodiments, the operations of the fluid distribution network may be modified to redirect fluid through a new pipe. Fluid may be pushed by a pump through multiple pipelines to a shared destination. For example, fluid may be pumped by a first electronic pump towards a second electronic pump through a first pipe and towards a third electronic pump through a second pipe. In response to the detection of an anomaly in the first pipe, a valve of the first electronic pump may be controlled to re-direct fluid that would have originally flowed through the first pipe to flow away from the first pipe. Instead, the valve may direct fluid to flow through the second pipe towards the third electronic pump or a final fluid destination (e.g., a pit, a lake, a waste repository, or the like).

In some embodiments, the fluid distribution network may set a target flow rate and broadcast the target flow rate to a plurality of electronic pumps. For example, the target flow rate of a first electronic pump may be equal to 100 liters per second, and the first electronic pump may broadcast the target flow rate to one or more other electronic pumps in the fluid distribution network. In response, the one or more other electronic pumps may increase their change their pump rotation speeds to rotation speeds indicated by their respective library of values to achieve a flow rate of 100 liters per second. For example, a second electronic pump may receive the wireless broadcast that includes the target flow rate. The second electronic pump may then switch from operating according to a first set of operational subroutines to operating according to a second set of operational subroutines, wherein the second set of operational subroutines include instructions to change a pump's rotation speed to a new RPM value based on the target flow rate. While some embodiments may set and broadcast the target flow rate in response to a detected anomaly, some embodiments may include options for a user to set the target flow rate and broadcast the target flow rate to other electronic pumps without requiring an anomaly to be detected.

Implementing operations to increase pump synchronicity may help maintain a target flow distribution or pressure distribution in the fluid distribution network. Synchronizing pump operations may also reduce the time it would take for a fluid distribution network to achieve a target flow rate. Maintain a target flow distribution or pressure distribution in the fluid distribution network. In addition, or alternatively, operations to increase pump synchronicity may extend the lifespan of the electronic pumps of the fluid distribution network as a whole. For example, a fluid distribution network may include operations to detect that a flow through a pipe is showing increased pressure at a first pipe section. Some embodiments may then determine that a first electronic pump that is upstream from the first pipe section is operating at an increased turbine rate in comparison to other electronic pumps in the fluid distribution network. In response, the fluid distribution network may decrease the spin rate of the turbine of the first electronic pump, which may decrease the pressure at the segment.

Figure 3:
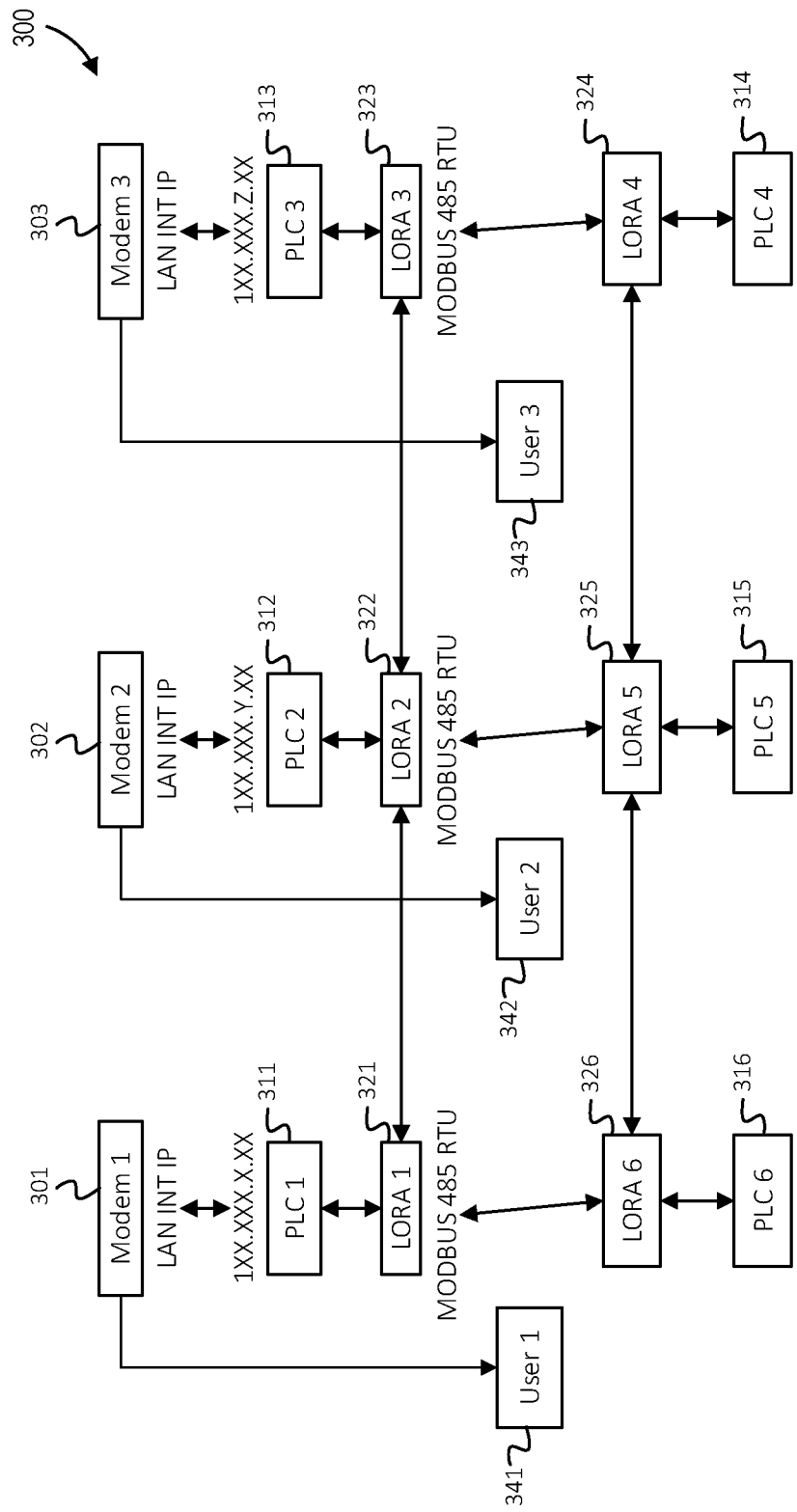
FIG. 3 shows an example of a mesh network implemented in a fluid distribution network, in accordance with some embodiments.

FIG. 3 shows an example of a mesh network implemented in a fluid distribution network, in accordance with some embodiments. FIG. 3 includes a mesh network 300, where each of the PLCs 311-316 may be in communication with a sensor attached to a different pump. Each of the PLCs 311-316 may also be in communication with one respective electronic device of the set of LORA-enabled devices 321-326. For example, the PLC 311 may be in communication with the LORA-enabled device 321. In some embodiments, one or more devices of the set of LORA-enabled devices 321-326 may include a Modbus 485 via a LORA-Modbus bridge, where the mesh network 300 may be a LORA wireless network ("LORA network").

As shown in the mesh network 300, each of the LORA-enabled devices 321-326 may act as nodes of the LORA network and be in communication with each other via the LORA network. In addition, the set of LORA-enabled devices 321-326 may be in communication with one or more of the set of users 341-343 via a set of modems 301-303 and use the set of modems 301-303 to communicate with any of the other LORA-enabled devices. For example, the first user 341 may send a message to the first modem 301 via a local Wi-Fi signal, which may then be transmitted to LORA-enabled device 321. The LORA-enabled device 321 may then send the message over the LORA network to the LORA-enabled device 325 and modify the operation of an attached device (e.g., a pump) via the PLC 315. Furthermore, various other values such as values for a library of values may be transmitted to one or more computing devices using the mesh network 300. For example, library update parameters may be transmitted from the modem 302 to the LORA-enabled device 322, which may then communicate the library update parameters to any computing devices in communication with any of the LORA-enabled devices 321-326 via a wireless signal. The computing devices may then update their respective library of values stored in local memory using the transferred library update parameters. In addition, the LORA-enabled devices 321-326 may be in communication with other devices, such as a geospatial position device, and may transmit one or more geospatial coordinates in a wireless signal to each other or other electronic devices.

Each of the PLC may communicate with a pump component, sensor, or other device of a fluid distribution network. Sensor data may be communicated from a PLC and transmitted from one of the LORA-enabled devices 321-326 to be received by a second one of the LORA-enabled devices 321-326. For example, with reference to FIG. 1, the PLC 315 may receive pressure measurements from a first electronic pump sensor of the pump 125 and communicate the pressure measurements to the LORA-enabled device 325, where the electronic pump sensor may be attached to pump 125 or otherwise be in communication with the pump 125. The LORA-enabled device 325 may then transmit a wireless signal that is received by the LORA-enabled device 326, which is attached to and in wired communication with the PLC 316 that part of or is otherwise in communication with the pump 126.

In some embodiments, the LORA-enabled devices 321-326 may include or be otherwise in communication with a computing device that includes a processor and memory. One or more computing devices of the LORA-enabled devices 321-326 may then compare measurements from one or more sensors or other measurement devices to determine the presence of a flow anomaly or other operational anomaly in a fluid distribution network being measured or controlled by the mesh network 300. For example, a computing device of the LORA-enabled device 326 may obtain pressure measurements communicated from the PLC 315 via a wireless signal. The computing device may then use the measurements from the PLC 315 in combination with pressure measurements from the PLC 316 and a library of values as described above to determine the flow statuses or other data with respect to the operation of a fluid distribution network being monitored by the mesh network 300.

In response to the detection of an anomaly, one or more pump devices controlled by the PLCs 311-316 may be controlled to react to a pump pressure. In some embodiments, the detected anomaly may be a pipe leak or burst. For example, in response to the detection of a pipe leak or burst in the pipe 136, a computing device that is part of or otherwise in communication with the mesh network 300 may send instructions to the PLC 315 to prevent further flow through the pump 125, which may be controlled by the PLC 315. In addition, or alternatively, the computing device may send instructions to the PLC 315 to increase a flow rate of the pump 126, which may be controlled by the PLC 315. In some embodiments, a first electronic pump controlled by the PLC 311 may be directly connected to a second electronic pump controlled by the PLC 315 via a pipe, and an instruction to increase flow through the second electronic pump while stopping flow through the first electronic pump may result in the evacuation of fluid in the pipe between the first electronic pump and the second electronic pump. Such evacuation operations for a pipe may be especially useful in response to the detection of a leak or burst in the pipe, which may decrease losses, damage, or contamination caused by the pipe leak or burst.

In some embodiments, the detected anomaly may be an improper mixing ratio. For example, in response to the detection of an improper mixing at the third electronic pump 123, the LORA-enabled device 323 may transmit a wireless signal that includes a first set of instructions to control operations of the first electronic pump 121 or a second set of instructions to control the second electronic pump 122. In some embodiments, both the first and second set of instructions may be sent concurrently. For example, the first set of instructions may include instructions to increase the flow rate of the second electronic pump 122, and the second set of instructions may include instructions to decrease the flow rate of the first electronic pump 121. Alternatively, in some embodiments, the operation of one pump may be changed without changing the operation of other electronic pumps. For example, the LORA-enabled device 323 may send a wireless signal that includes a first set of instructions to increase the flow rate of the second electronic pump 122 without changing the flow rate of the first electronic pump 121. As discussed above, other pump operation changes are possible, such as changing an amount of tracing fluid being added, changing a temperature by changing a heat flow into the fluid, changing a fluid pH, or the like. In some embodiments, using a responsive system that can alter fluid input ratios by changing the operations of electronic pumps that are upstream of the mixture may reduce the need for additional flow equipment such as specialized pipe manifolds.

Figure 4:
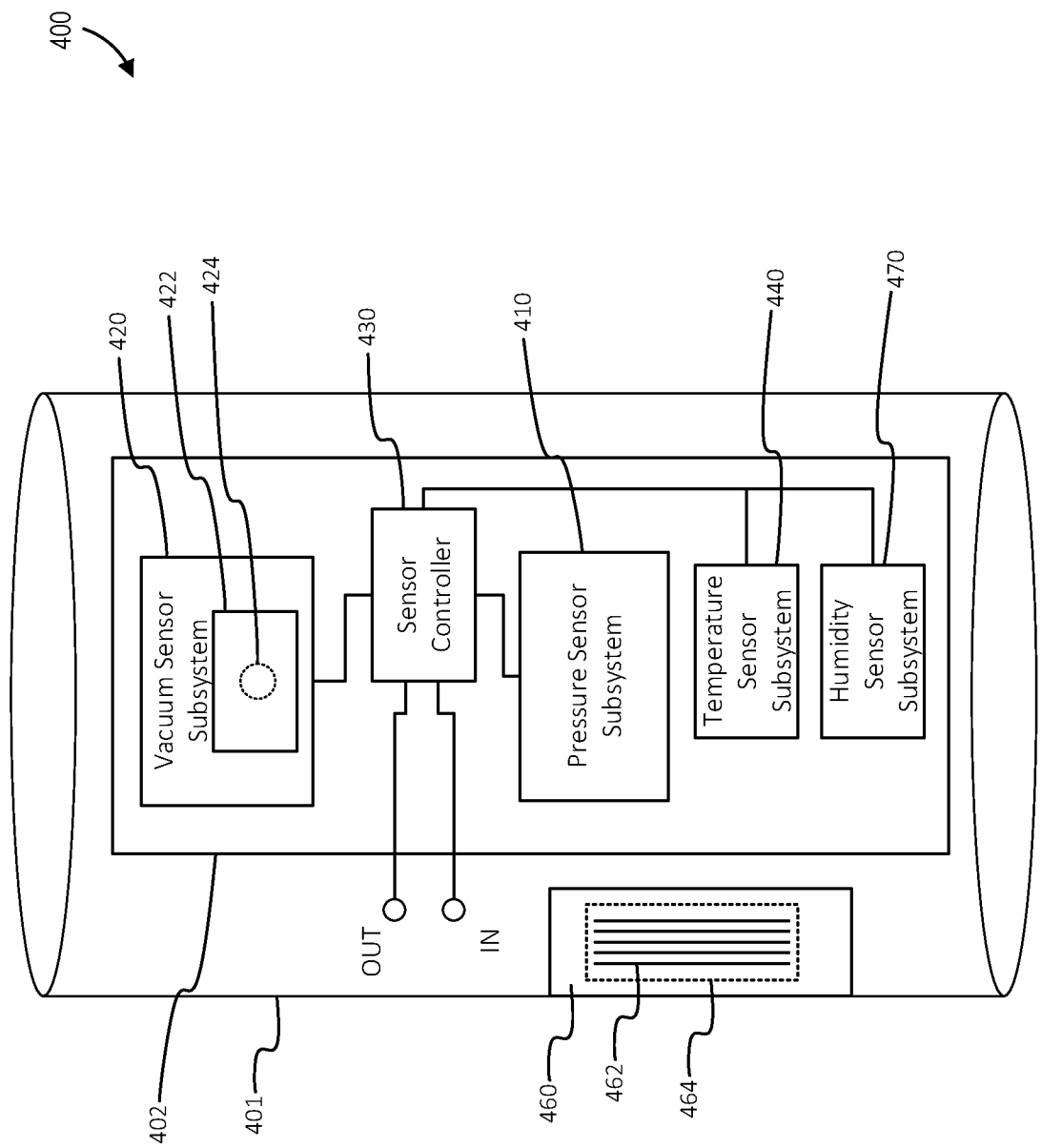
FIG. 4 shows an example multi-sensing device, in accordance with some embodiments.

FIG. 4 shows an example multi-sensing device, in accordance with some embodiments. In some embodiments, a multi-sensing device 400 may include a protective enclosure 401 surrounding a base 402. A pressure sensor subsystem 410 may be mounted on the base 402. A vacuum sensor subsystem 420 may also be mounted on the base 402. As discussed above, the vacuum sensor subsystem may include vacuum sensor protector 422 to protect a vacuum sensor 424. In some embodiments, the vacuum sensor protector 422 may include a plate, screen, pressure gauge, or another physical impediment to protect vacuum sensor 424.

The multi-sensing device 400 may include a sensor controller 430 that is also mounted on the base 402. In some embodiments, the sensor controller 430 may activate or deactivate the vacuum sensor subsystem 420 based on a pressure measurement from the pressure sensor subsystem 410. For example, the sensor controller 430 may activate the vacuum sensor subsystem 420 in response to the pressure sensor subsystem 410 providing a pressure measurement less than a pressure threshold. In some embodiments, activating the vacuum sensor subsystem may include changing the state of the vacuum sensor protector 422. Alternatively, or in addition, activating the vacuum sensor subsystem 420 may include powering one or more components of the vacuum sensor 424. For example, the vacuum sensor 424 may include a variable capacitance device or piezoresistive device to provide pressure measurements. Capacitance changes in a variable capacitance device or resistivity changes in a piezoresistive device may be correlated with a pressure measurement from the vacuum sensor 424.

In some embodiments, the multi-sensing device 400 may include a temperature sensor subsystem 440. The temperature sensor subsystem 440 may include one or more temperature sensors to measure a temperature and report the temperature from the multi-sensing device 400. In some embodiments, the temperature sensor may output temperature measurements to the sensor controller 430, which may then apply one or more pre-processing steps to the temperature measurements. For example, the sensor controller 430 may apply a sensor noise mitigation operation to reduce the effect of sensor noise on the temperature measurements. In some embodiments, the sensor controller 430 may perform operations to report a set of output values indicating a pressure value, a temperature value, and a measurement time associated with both the pressure value and the temperature value. Alternatively, or in addition, the sensor controller 430 may perform operations to report a pressure measurement, a first measurement time at which the pressure measurement was obtained, a temperature measurement, and a second measurement time at which the temperature measurement was obtained, where the first measurement time and the second measurement time are independent of each other.

In some embodiments, the multi-sensing device 400 may include a vent system 460 that includes a set of vents 462 and a filter 464. The set of vents 462 may permit airflow through the protective enclosure 401 while the filter 464 may prevent moisture from passing from the exterior of the protective enclosure 401 to the interior of the protective enclosure 401. The filter 464 may include one or more moisture-blocking materials, such as fabrics, polymers, or desiccants. In some embodiments, the multi-sensing device 400 may include a humidity sensor 470 to monitor a humidity level. In some embodiments, humidity changes may affect pressure measurements, and detected humidity changes reported by the humidity sensor 470 may be used to adjust a reported pressure or temperature reading. Alternatively, or in addition, a measured humidity may be compared to a humidity threshold. If the measured humidity exceeds the humidity threshold, the multi-sensing device 400 may send a message indicating that the humidity threshold is exceeded. In some embodiments, the system may flag pressure, temperature, or other measurements as inaccurate if the data is associated with a message indicating that the humidity threshold is exceeded.

In some embodiments, as discussed above, a mesh network may communicate the propagation of a pressure wave. In some embodiments, the vacuum sensor subsystem 420 may be pre-emptively deactivated even if a reported pressure is less than a pressure threshold in response to instructions from a device of the mesh network. For example, a first device of a mesh network may detect the existence of a pressure spike traveling through the pipe network towards the multi-sensing device 400. In response, a computing device may transmit instructions to the sensor controller 430 to deactivate the vacuum sensor subsystem 420 or otherwise protect the vacuum sensor 424.

Computer System

Figure 5:
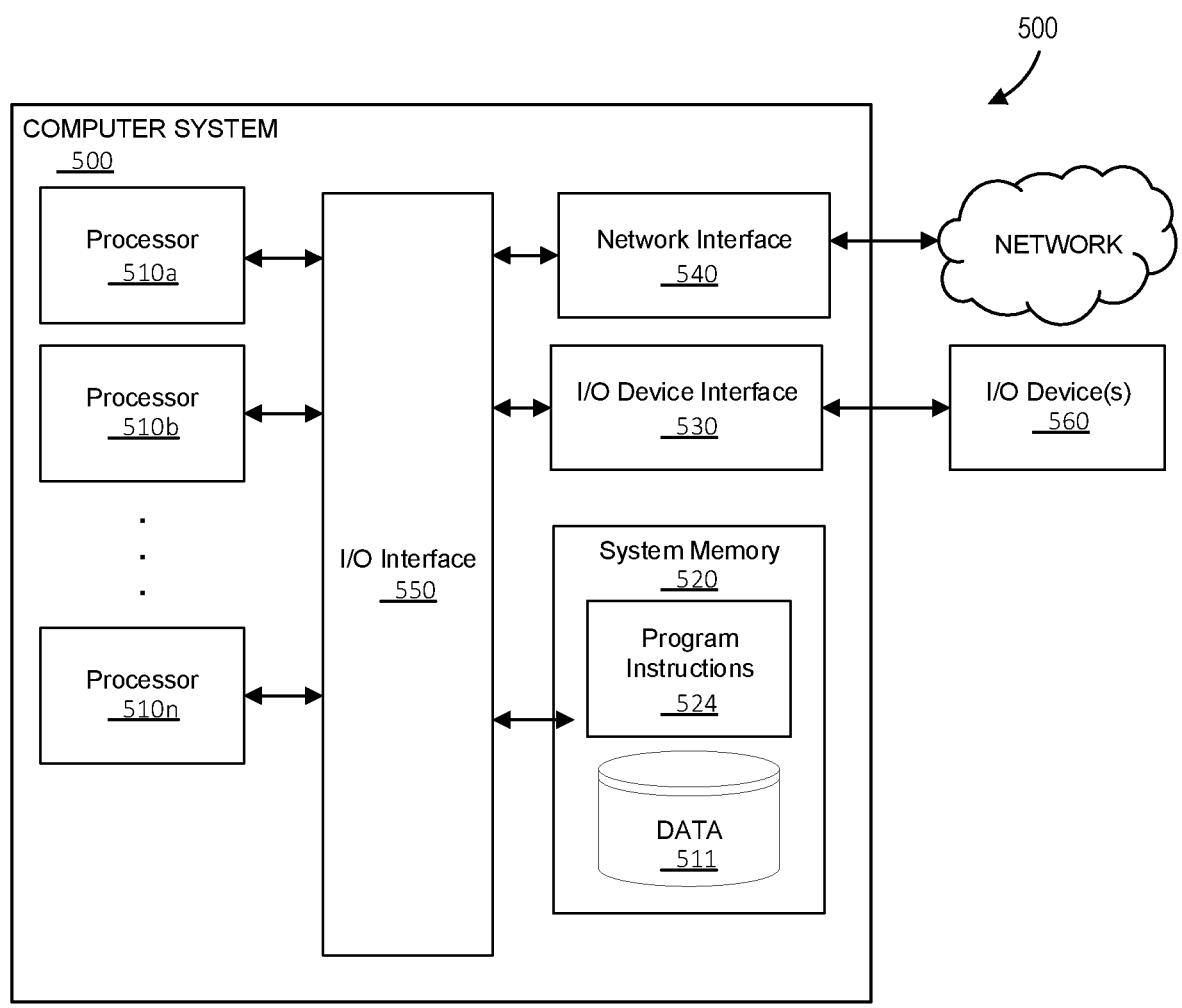
FIG. 5 shows an example of a computing device by which the present techniques may be implemented, in accordance with some embodiments.

FIG. 5 shows an exemplary computer system 500 by which the present techniques may be implemented in accordance with some embodiments. Various portions of systems and methods described herein, may include or be executed on one or more computer systems similar to computer system 500. Further, processes and modules described herein may be executed by one or more processing systems similar to that of computer system 500.

Computer system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computer system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a vision processing unit (VPU), a neuromorphic complementary metal-oxide-semiconductor (CMOS) chip, an FPGA (field programmable gate array), a PGA (programmable gate array), or an ASIC (application specific integrated circuit) such as a tensor processing unit (TPU). Computer system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 500 or data 511. Program instructions 500 may be executable by a processor (e.g., one or more of processors 510a-510n) to implement one or more embodiments of the present techniques. Program instructions 500 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, sent via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information sent over networks, in which case, to the extent information (e.g., content) is said to be supplied or otherwise provided, the information may provide by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with a computer system, a set of operational parameters, wherein operations of a first electronic pump are based on the set of operational parameters; obtaining, with the computer system, a first set of measurements collected by a first electronic pump sensor attached to the first electronic pump; obtaining, with the computer system, a second set of measurements collected by a second electronic pump sensor attached to a second electronic pump, wherein fluid flows between the first electronic pump and the second electronic pump; transmitting, with the computer system, the second set of measurements from the second electronic pump to the first electronic pump via a first wireless signal; determining, with the computer system, a set of state representations based on the first set of measurements and the second set of measurements; determining, with the computer system, a reference key based on the set of operational parameters, wherein the reference key is one of a set of reference keys, and wherein each respective reference key of the set of reference keys is associated with a respective threshold parameter in a library of values; retrieving, with the computer system, a set of threshold parameter associated with the reference key; determining a threshold based on the set of threshold parameters; determining, with the computer system, whether a flow of the fluid between the first electronic pump and the second electronic pump is in an anomalous state based on the set of state representations and the threshold; and changing, with the computer system, a pump operation of at least one of the first electronic pump and the second electronic pump in response to a determination that the flow is in the anomalous state.

2. The medium of embodiment 1, wherein the threshold is a first measure of central tendency, and wherein the operations further comprise determining the first measure of central tendency based on a third set of measurements, wherein the third set of measurements is obtained from the second electronic pump sensor before the second electronic pump sensor obtained the second set of measurements, wherein: determining the set of state representations comprises determining a second measure of central tendency based on the second set of measurements; and determining whether the flow is in the anomalous state comprises determining whether the second measure of central tendency exceeds a threshold based on the first measure of central tendency.

3. The medium of embodiment 2, wherein determining a reference key further comprises determining a reference key based on the first set of measurements.

4. The medium of any of embodiments 1 to 3, wherein sending the second set of measurements from the second electronic pump to the first electronic pump comprises: setting the second electronic pump as a destination node of the second set of measurements; receiving the second set of measurements from the first electronic pump at a third node of a mesh network, wherein the mesh network comprises the first electronic pump, the second electronic pump, and the third node; determining that the third node is not the destination node; and sending the second set of measurements from the third node.

5. The medium of any of embodiments 1 to 4, wherein determining the set of state representations comprises: updating a sum of previous measurements based on the first set of measurements or the second set of measurements; updating a total number of measurements; and determining a value of the set of state representations based on a ratio of the sum of previous measurements to the total number of measurements.

6. The medium of any of embodiments 1 to 5, wherein a pair of electronic pumps comprises the first electronic pump and the second electronic pump, and wherein changing the pump operation comprises: decreasing a pump flow rate of one of the pair of electronic pumps; and increasing a pump flow rate of the other of the pair of electronic pumps.

7. The medium of any of embodiments 1 to 6, wherein the first electronic pump and the second electronic pump are connected by a first pipe, and wherein changing the pump operation comprises changing a valve of the first electronic pump or the second electronic pump to re-direct fluid flow, and wherein re-direction of the fluid flow decreases fluid flow through the first pipe and increases fluid flow through a second pipe, and wherein the second pipe is connected to only one of the first electronic pump or the second electronic pump.

8. The medium of any of embodiments 1 to 7, further comprising: obtaining a third set of measurements collected by a third electronic pump sensor of a third electronic pump, wherein fluid flows between the first electronic pump and the third electronic pump; and sending the third set of measurements from the third electronic pump to the first electronic pump, wherein determining the set of state representations comprises determining the set of state representations based on the third set of measurements.

9. The medium of embodiment 8, the operations further comprising: obtaining a fourth set of measurements collected by a fourth electronic pump sensor of a fourth electronic pump, wherein fluid flows between the fourth electronic pump and the second electronic pump; sending the fourth set of measurements from the fourth electronic pump to the second electronic pump; determining an intermediate set of state representations based on the fourth set of measurements and the second set of measurements using a set of processors of the second electronic pump, wherein determining the set of state representations comprises determining the set of state representations based on the intermediate set of state representations; determining a first connection quality measurement between the first electronic pump and a computing device and a second connection quality measurement between the second electronic pump and the computing device; and sending the first set of measurements from the first electronic pump based on a comparison between the first connection quality measurement and the second connection quality measurement.

10. The medium of any of embodiments 1 to 9, wherein determining the set of state representations comprises determining a set of frequency values based on the first set of measurements.

11. The medium of any of embodiments 1 to 10, wherein determining the set of state representations comprises determining a difference between a pressure measurement of the first set of measurements and a pressure measurement of the second set of measurements.

12. The medium of any of embodiments 1 to 11, the operation further comprise: obtaining an update parameter from a second wireless signal via the first electronic pump; and updating the library of values based on the update parameter.

13. The medium of any of embodiments 1 to 12, wherein determining whether the flow is in the anomalous state comprises determining an output using a neural network by: providing the set of state representations as an input to an input layer of the neural network, wherein the input layer comprises a first set of neural network nodes; determining an output value using a second layer of the neural network based on an intermediate output of the input layer; and determining a category for a state of the flow based on the output value.

14. The medium of any of embodiments 1 to 13, wherein determining whether the flow is in the anomalous state comprises determining an output using a neural network by: providing a first state representation as an input to an input layer of the neural network, wherein the first state representation is associated with a first measurement that is obtained at a first time point, and wherein the first state representation is in the set of state representations; determining a first output value using a second layer of the neural network based on an intermediate output of the input layer; providing a second state representation and the first output value to the input layer of the neural network, wherein the second state representation is associated with a second measurement that is obtained at a second time point, and wherein the second time point is before the first time point; and determining a category for a state of the flow based on the first output value.

15. The medium of any of embodiments 1 to 14, further comprising changing a heat flow into the fluid in response to the determination that the flow is in the anomalous state.

16. The medium of any of embodiments 1 to 15, wherein a third sensor is spatially between the first electronic pump sensor and the second electronic pump sensor, and wherein determining whether the flow is in the anomalous state comprises determining a predicted measurement at a position of the third sensor.

17. The medium of any of embodiments 1 to 16, further comprising transmitting an indicator, wherein the indicator indicates that the flow is in the anomalous state.

18. The medium of any of embodiments 1 to 17, the operations further comprising broadcasting a set of geospatial coordinates, wherein the set of geospatial coordinates is associated with a geospatial position the first electronic pump, a geospatial position of the second electronic pump, or a geospatial position between the first electronic pump and the second electronic pump.

19. The medium of any of embodiments 1 to 18, the operations further comprising determining a fluid flow rate based on an operational parameter of the first electronic pump and a measurement of the first electronic pump sensor.

20. A method comprising: obtaining, with a computer system, a set of operational parameters, wherein operations of a first electronic pump are based on the set of operational parameters; obtaining, with the computer system, a first set of measurements collected by a first electronic pump sensor attached to the first electronic pump; obtaining, with the computer system, a second set of measurements collected by a second electronic pump sensor attached to a second electronic pump, wherein fluid flows between the first electronic pump and the second electronic pump; transmitting, with the computer system, the second set of measurements from the second electronic pump to the first electronic pump via a first wireless signal; determining, with the computer system, a set of state representations based on the first set of measurements and the second set of measurements; determining, with the computer system, a reference key based on the set of operational parameters, wherein the reference key is one of a set of reference keys, and wherein each respective reference key of the set of reference keys is associated with a respective threshold in a library of values; retrieving, with the computer system, a threshold associated with the reference key; determining, with the computer system, whether a flow of the fluid between the first electronic pump and the second electronic pump is in an anomalous state based on the set of state representations and the threshold; and changing, with the computer system, a pump operation of at least one of the first electronic pump and the second electronic pump in response to a determination that the flow is in the anomalous state.

What is claimed is:

1. A tangible, non-transitory, machine-readable medium storing instructions that when executed by one or more processors effectuate operations comprising:
   obtaining, with a computer system, a set of operational parameters, wherein operations of a first electronic pump are based on the set of operational parameters;
   obtaining, with the computer system, a first set of measurements collected by a first electronic pump sensor attached to the first electronic pump;
   obtaining, with the computer system, a second set of measurements collected by a second electronic sensor at a second location, wherein fluid flows between the first electronic pump and the second location;
   determining, with the computer system, a set of state representations based on the first set of measurements, the second set of measurements, or a combination thereof;
   determining, with the computer system, a reference key based on the set of operational parameters, wherein the reference key is one of a set of reference keys, and wherein each respective reference key of the set of reference keys is associated with a respective threshold parameter in a library of values;
   determining, with the computer system, a threshold parameter associated with the reference key;
   determining, with the computer system, whether a flow of the fluid between the first electronic pump and the second location is in an anomalous state based on the set of state representations and the threshold parameter; and
   changing, with the computer system, the operations of the first electronic pump in response to a determination that the flow is in the anomalous state.

2. The medium of claim 1, wherein the threshold parameter is a first measure of central tendency, and wherein the operations further comprise determining the first measure of central tendency based on a third set of measurements, wherein the third set of measurements is obtained from the second electronic sensor before the second electronic sensor obtained the second set of measurements, wherein:
   determining the set of state representations comprises determining a second measure of central tendency based on the second set of measurements; and
   determining whether the flow is in the anomalous state comprises determining whether the second measure of central tendency exceeds the threshold parameter based on the first measure of central tendency.

3. The medium of claim 2, wherein determining a reference key comprises determining a reference key based on the first set of measurements.

4. The medium of claim 1, further comprising sending the second set of measurements from the second electronic sensor to the first electronic pump comprising:
   setting the second electronic sensor as a destination node of the second set of measurements;
   receiving the second set of measurements from the first electronic pump at a third node of a mesh network, wherein the mesh network comprises the first electronic pump, the second electronic sensor, and the third node;
   determining that the third node is not the destination node; and
   in response to determining that the third node is not the destination node, sending the second set of measurements from the third node.

5. The medium of claim 1, wherein determining the set of state representations comprises:

updating a sum of previous measurements based on the first set of measurements, the second set of measurements, or a combination thereof;
updating a total number of measurements; and
determining a value of the set of state representations based on a ratio of the sum of previous measurements to the total number of measurements.

6. The medium of claim 1, wherein the second electronic sensor corresponding to a second electronic pump, and wherein changing the pump operations of the first electronic pump comprises:
decreasing a pump flow rate of one of the first electronic pump and the second electronic pump; and
increasing a pump flow rate of the other of the first electronic pump and the second electronic pump.

7. The medium of claim 1, wherein the first electronic pump and the second location are connected by a first pipe, and wherein changing the operations comprises changing a valve to re-direct fluid flow, and wherein re-direction of the fluid flow decreases fluid flow through the first pipe and increases fluid flow through a second pipe, and wherein the second pipe is connected to only one of the first electronic pump or the second location.

8. The medium of claim 1, further comprising:
obtaining a third set of measurements collected by a third electronic sensor at a third location, wherein fluid flows between the first electronic pump and the third location,
wherein determining the set of state representations comprises determining the set of state representations based on the third set of measurements.

9. The medium of claim 8, the operations further comprising:
obtaining a fourth set of measurements collected by a fourth electronic sensor at a fourth location, wherein fluid flows between the fourth location and the second location; and
determining an intermediate set of state representations based on the fourth set of measurements and the second set of measurements using a processor of the second electronic sensor, wherein determining the set of state representations comprises determining the set of state representations based on the intermediate set of state representations.

10. The medium of claim 1, wherein determining the set of state representations comprises determining a difference between a pressure measurement of the first set of measurements and a pressure measurement of the second set of measurements.

11. The medium of claim 1, the operations further comprising:
obtaining an updated operational parameter from the first electronic pump; and
updating the library of values based on the updated operational parameter.

12. The medium of claim 1, wherein determining whether the flow is in the anomalous state comprises determining an output using a neural network by:
providing the set of state representations as an input to first layer of the neural network, wherein the first layer comprises a first set of neural network nodes;
determining an output value using a second layer of the neural network based on an output of the first layer; and
determining if the flow is in an anomalous state based on the output value.

13. The medium of claim 1, wherein determining whether the flow is in the anomalous state comprises determining an output using a neural network by:

providing a second state representation to an input layer of the neural network, wherein the second state representation is associated with a second measurement that is obtained at a second time point, and wherein the second time point is before a first time point;
determining a second output value using a second layer of the neural network based on a second output of the first layer;
providing a first state representation and the second output value as an input to the first layer of the neural network, wherein the first state representation is associated with a first measurement that is obtained at the first time point;
determining a first output value using the second layer of the neural network based on a first output of the first layer;
determining if the flow is in an anomalous state based on the first output value.

14. The medium of claim 1, wherein changing the operations of the first electronic pump comprise changing a heat flow into the fluid in response to the determination that the flow is in the anomalous state.

15. The medium of claim 1, wherein a third electronic sensor is spatially between the first electronic pump sensor and the second electronic sensor, and wherein determining whether the flow is in the anomalous state comprises:
determining a predicted measurement at a position of the third sensor based on the first set of measurements, the second set of measurements, or a combination thereof;
obtaining a third measurement collected by the third electronic sensor;
comparing the predicted measurement to the obtained third measurement; and
determining whether the flow of the fluid between the first electronic pump and the second location is in an anomalous state based on the comparison.

16. The medium of claim 1, wherein changing the operations of the first electronic pump comprises transmitting an indicator, the indicator indicating that the flow is in the anomalous state.

17. The medium of claim 1, the operations further comprising broadcasting a set of geospatial coordinates, wherein the set of geospatial coordinates is associated with a geospatial position of at least one of the first electronic pump, the second location, a geospatial position between the first electronic pump and the second location, and a combination thereof.

18. The medium of claim 1, the operations further comprising determining a fluid flow rate based on an operational parameter of the first electronic pump and a measurement of the first electronic pump sensor.

19. The medium of claim 1, further comprising:
determining a first connection quality measurement between the first electronic pump and a computing device and a second connection quality measurement between the second electronic sensor and the computing device;
comparing the first connection quality measurement and the second connection quality measurement;
sending the first set of measurements from the first electronic pump or the second set of measurements from the second electronic sensor to a remote device based on the comparison to the computer system; and
determining, at the remote device, the set of state representations based on the sent set of measurements.

20. A method comprising:
obtaining, with a computer system, a set of operational parameters, wherein operations of a first electronic pump are based on the set of operational parameters;
obtaining, with the computer system, a first set of measurements collected by a first electronic pump sensor attached to the first electronic pump;
obtaining, with the computer system, a second set of measurements collected by a second electronic sensor at a second location, wherein fluid flows between the first electronic pump and the second location;
determining, with the computer system, a set of state representations based on the first set of measurements, the second set of measurements, or a combination thereof;
determining, with the computer system, a reference key based on the set of operational parameters, wherein the reference key is one of a set of reference keys, and wherein each respective reference key of the set of reference keys is associated with a respective threshold parameter in a library of values;
determining, with the computer system, a set of threshold parameter associated with the reference key;
determining, with the computer system, whether a flow of the fluid between the first electronic pump and the second location is in an anomalous state based on the set of state representations and the threshold parameter; and
changing, with the computer system, the operations of the first electronic pump in response to a determination that the flow is in the anomalous state.

* * * * *